United States Patent
Gunnels

[11] Patent Number: 6,153,857
[45] Date of Patent: Nov. 28, 2000

[54] PORTABLE FOOD AND UTENSIL STORAGE DEVICE

[76] Inventor: Auline J. Gunnels, 8707 E. 58th St., Kansas City, Mo. 64129-2733

[21] Appl. No.: 09/189,594

[22] Filed: Nov. 10, 1998

[51] Int. Cl.[7] ..................................................... A47J 37/00
[52] U.S. Cl. ......................... 219/386; 126/37 B; 126/29; 126/220; 126/9 R; 126/37 A; 312/236; 312/327; 99/340
[58] Field of Search .................... 219/386, 387, 219/385, 415, 433, 428, 429, 430, 431, 436; 126/261, 29–30, 9 R, 11, 37 B; 165/58; 190/111; 62/457.4

[56] References Cited

U.S. PATENT DOCUMENTS

| | | | |
|---|---|---|---|
| 244,898 | 7/1881 | Hoskins | 206/541 |
| 1,244,407 | 10/1917 | Avedisian et al. | 126/37 B |
| 1,411,624 | 4/1922 | Grottger | 126/37 A |
| 1,431,953 | 10/1922 | Henoch | 126/37 B |
| 1,458,679 | 6/1923 | Bishop | 206/541 |
| 1,989,749 | 2/1935 | Fullerton | 312/236 |
| 2,015,295 | 9/1935 | Steingruber | 126/37 B |
| 2,321,703 | 6/1943 | Rivard | 126/37 B |
| 2,775,781 | 1/1957 | Morgan | 312/326 |
| 3,515,119 | 6/1970 | Kivela | 126/37 R |
| 3,682,157 | 8/1972 | Perl | 126/37 B |
| 3,692,351 | 9/1972 | Christopher et al. | 126/37 B |
| 4,027,727 | 6/1977 | Pullens | 165/48 |
| 4,037,081 | 7/1977 | Aldridge et al. | 219/387 |
| 4,866,572 | 9/1989 | Blodgett | |
| 4,873,841 | 10/1989 | Bradshaw et al. | |
| 5,145,158 | 9/1992 | Lindsey | |
| 5,465,985 | 11/1995 | Devan et al. | |
| 5,493,874 | 2/1996 | Landgrebe | |
| 5,526,907 | 6/1996 | Trawick et al. | 190/111 |
| 5,605,056 | 2/1997 | Brown et al. | 62/457.4 |
| 5,960,782 | 10/1999 | Clements et al. | 126/37 B |

FOREIGN PATENT DOCUMENTS

| 70740 | 12/1915 | Austria | 126/37 B |
|---|---|---|---|

Primary Examiner—John A. Jeffery
Attorney, Agent, or Firm—Kenneth L Tolar

[57] ABSTRACT

A portable food and utensil storage device includes a box like base component having a plurality of wheels attached to its bottom surface for rolling the device along a supporting surface. The interior of the base component includes a plurality of segregated compartments each configured and designed to retain hot or cold food items as well as various accessory items therein. The base component includes an opening adjacent its bottom surface in communication with an interior chamber for slidably receiving a gas fueled grill assembly. The top end of the base component is selectively coverable with a lid that pivotably engages the top edge of its rear wall. The inwardly facing side of the lid includes a plurality of bands and loops for retaining silverware, cups and similar items thereon.

3 Claims, 1 Drawing Sheet

PORTABLE FOOD AND UTENSIL STORAGE DEVICE

BACKGROUND OF THE INVENTION

The present invention relates to a portable food and utensil storage apparatus for use while picnicking, camping or participating in similar outdoor events.

DESCRIPTION OF THE PRIOR ART

Various outdoor events such as camping, fishing and picnicking involve transporting, cooking and storing hot and cold food items as well as appliances and utensils. Accordingly, one must transport a portable cooking appliance along with numerous containers, each capable of storing hot or cold food products, silverware, cups and various other miscellaneous items. Loading and transporting the various containers and accessories is burdensome, laborious and inconvenient. Furthermore, the devices occupy a significant amount of storage space within a vehicle.

The present invention provides a compact, unitary storage device uniquely configured to retain utensils, hot and cold food items as well as an accompanying gas fueled grill. Various portable cooking and food storage devices exist in the prior art. For example, U.S. Pat. No. 5,065,056 issued to Brown et al relates to a portable cooler having removable drawers with grills suspended thereon allowing items to be stored within the cooler without contacting the ice.

U.S. Pat. No. 5,493,874 issued to Landgrebe relates to a heating and cooling chest including two separate, insulated compartments each having a designated cover. A first compartment includes a chilling medium while the other includes a heating medium.

U.S. Pat. No. 5,465,985 issued to Devan et al relates to a wheeled portable cooler. The device includes a mounting assembly that allows the wheels to be latched in either a raised or lowered position relative to the container structure.

U.S. Pat. No. 5,145,158 issued to Lindsey relates to a cooler and grill combination. The cooler includes a lid having a recess on its upper surface adapted to hold the disassembled grill.

U.S. Pat. No. 4,873,871 issued to Bradshaw et al relates to a portable cooler comprising a cooling compartment having a pair of wheels coupled to one end and a handle attached to an opposing end.

U.S. Pat. No. 4,866,572 issued to Blodgett relates to a portable food preparation unit including a microwave oven, a refrigeration or ice chest, a container for carrying articles necessary for meal preparation and a power supply unit.

Although various cooler and grill configurations exist in the prior art, none include all of the unique features and advantages of the present invention. The present invention provides a storage device having a plurality of segregated storage compartments therein with a drawer type gas grill slidably received beneath the compartments.

SUMMARY OF THE INVENTION

The present invention relates to a portable food and utensil storage device comprising a substantially rectangular, box-like base component having a bottom wall with front, rear and two opposing side walls vertically depending therefrom. The front wall includes a substantially rectangular opening in communication with an interior chamber for slidably receiving a gas fueled grill assembly. The base component further includes a lid pivotally engaging the top edge of the rear wall providing access to segregated hot and cold food storage compartments and an accessory item storage compartment disposed therebetween. The hot food storage compartment is defined by one or more outer walls having heating coils embedded therein that are powered by the vehicle's battery via a cigarette lighter adapter. The lid includes a plurality of retaining means on an inwardly facing side for conveniently retaining various silverware items. It is therefore an object of the present invention to provide a storage device which conveniently stores and transports hot and cold food items, silverware, miscellaneous accessories and a portable gas grill.

It is yet another object of the present invention to provide a storage device which eliminates the burden associated with dining and cooking outdoors.

It is yet another object of the present invention to provide a multipurpose storage device having a hot food compartment that may be selectively heated with a heating means powered by the vehicle's battery. Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
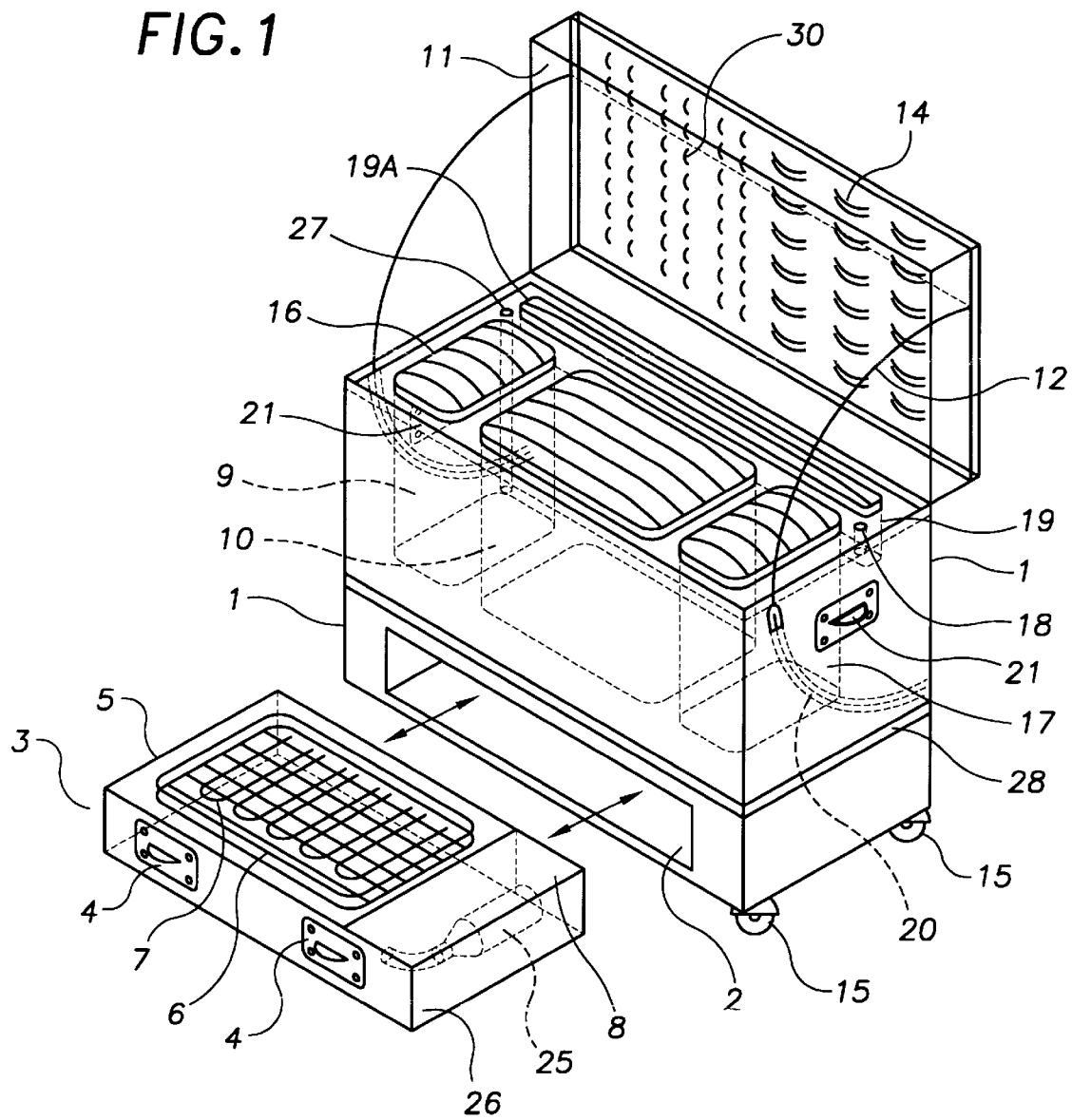
FIG. 1 is a perspective view of the inventive device.
Figure 2:
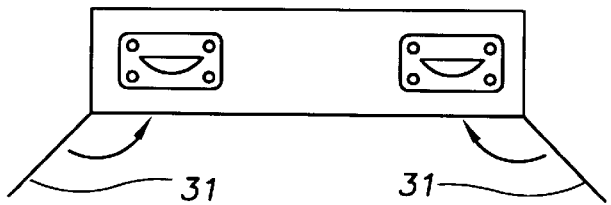
FIG. 2 is a front view of the portable gas grill according to the present invention.

Referring now to FIGS. 1 and 2, the present invention relates to multi-purpose food and utensil storage device. The device includes a substantially rectangular, hollow base component 1 having a bottom surface with a front wall, a rear wall and two opposing side walls vertically depending therefrom and a top end. On the front wall adjacent the bottom surface is a substantially rectangular opening 2 in communication with an interior chamber for slidably receiving a drawer type, gas fueled grill assembly 3.

The gas fueled grill assembly includes a housing 5 having an upper surface, a lower surface with a front edge, a rear edge and two opposing side edges therebetween. A pair of handles 4 are disposed on the front edge to assist a user in removing the grill from the interior chamber. The housing further includes a grill member 6 removably supported on its top surface having a plurality of gas burners 7 therebelow. A side edge of the housing includes a compartment 26 for receiving a gas storage container 25 for fueling the burners. The gas container compartment is selectively accessible with a pivotable lid 8. Pivotally engaging the bottom surface of the grill assembly housing are a pair of legs 31, pivotable between a substantially vertical position to support the housing a predetermined distance above a support surface, and a horizontal position, collapsed against the housing bottom surface.

The top end of the base component includes three segregated openings each in communication with a designated compartment for storing various items. Each compartment opening is coverable with a removable lid member 16. A first side compartment 9 relates to an ice chest for storing perishable food items, beverages and similar objects as well as a cooling medium such as ice. An opposing side compartment 17 is defined by at least one outer wall having heating coils embedded therein for storing hot food items.

The heating coils are in electrical communication with a receptacle 18 adjacent the heated storage compartment for receiving a cigarette lighter adapter electrical cord to power the heating coils with the vehicle's battery.

An intermediate compartment 10 is significantly larger than the heated and cold food item storage compartments and may be used to store larger items such as clothing and amusement devices. Adjacent the cold item storage compartment is an elongated tubular, vertical receptacle 27 to support a pole in an upright position, such as poles used to suspend flags, umbrellas and similar items. The base component also includes a longitudinal compartment 19 having a removable lid 19A for storing an umbrella or similar object. A horizontal layer of insulation 28 is disposed between the compartments and the grill assembly interior chamber to minimize heat transfer therebetween.

The top end of the base component and the various storage compartments are selectively coverable with a substantially rectangular lid component 11. The lid component has a first peripheral edge hingedly attached to the top edge of the base component rear wall. An arcuate arm 12 extends from each of two opposing side edges of the lid component, each arm slidably received within an arcuate slot 20 within a side wall of the base component. Each arcuate arm includes a stop member 13 at a distal end preventing the arm from being completely displaced from the slot and to stabilize the lid member in an open, vertical position. On the frontwardly facing side of the lid component are rows and columns of vertically disposed loops 30 each for receiving a silverware item such a knife, fork or spoon. Adjacent the silverware storage loops are rows and columns of horizontally disposed bands 14 each for receiving a cup or similar item.

Attached to the bottom wall of the base component are a plurality of wheels 15 to allow a user to roll the device along a supporting surface. Each opposing side wall includes a pivotable handle member 21 to assist a user in lifting the device.

The base component and lid are preferably constructed with plastic or a similar equivalent while the gas grill assembly is constructed with steel or stainless steel. However, as will be readily apparent to those skilled in the art, the size, shape and materials of construction may be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A storage device comprising:

a hollow base component having a bottom surface with a plurality of side walls vertically depending therefrom, each side wall having a handle thereon, said base component having an opening on one of said side walls, said opening adjacent the bottom surface and in communication with an interior chamber; said base component further including a vertically disposed tubular receptacle dimensioned to receive an elongated pole for supporting the pole in an upright position;

a plurality of wheels mounted to the bottom surface of said base component to assist a user in rolling the base component along a supporting surface;

a lid hingedly engaging a sidewall of said base component, said lid member including a frontwardly facing side having a plurality of horizontal bands thereon for retaining utensils and a plurality of vertical loops on the frontwardly facing side of said lid for retaining utensils;

said lid component further including an arcuate arm extending from each of two opposing edges, each of said arms slidably received within an arcuate slot on a designated base component side wall, each of said arms each having a stop member at a distal end for retaining said arm within said slot and to minimize the degree of pivot of said lid;

a plurality of segregated storage compartments within said base component, each of said components encloseable with a removable cover, one of said compartments being heatable to store hot food items therein;

a grill means for cooking food items, said grill means slidably received within said interior chamber, said grill means including a drawer type housing having an upper surface, a bottom surface, a front edge having a handle thereon and two opposing side edges; a grill member suspended above the upper surface of said housing with a plurality of gas burners therebelow; a compartment within said housing and adjacent a side edge thereof with a combustible gas container received therein, said gas container in selective communication with said burners, said grill means housing further including a pivotable lid for a selectively enclosing said gas container compartment.

2. The device accordingly to claim 1 further comprising a shallow, elongated compartment for storing an accessory item.

3. The device according to claim 1 wherein said grill means further comprises a pair of leg members hingedly engaging the bottom surface of said grill means housing, said leg members pivotable between a substantially vertical position to support said grill housing a predetermined distance above a support surface and a horizontal position, wherein said legs are collapsed against the bottom surface of said housing.

* * * * *